United States Patent [19]

Marie

[11] 4,228,253

[45] Oct. 14, 1980

[54] PROCESS FOR MAKING ALPHA-OLEFIN POLYMERS OR COPOLYMERS WITH HIGH ISOTACTICITY INDEX

[75] Inventor: Gilbert Marie, Pau, France

[73] Assignee: Ato Chimie, Paris, France

[21] Appl. No.: 48,172

[22] Filed: Jun. 13, 1979

[30] Foreign Application Priority Data

Jun. 21, 1978 [FR] France .............................. 78 18531

[51] Int. Cl.$^2$ ............................ C08F 4/16; C08F 4/52
[52] U.S. Cl. ................................ 525/247; 252/429 B; 260/33.6 UA; 526/139; 526/140; 526/141; 526/142; 526/351
[58] Field of Search ............... 526/139, 140, 141, 142; 525/247

[56] References Cited

U.S. PATENT DOCUMENTS 2,932,633   4/1960   Juveland et al. ..................... 526/141

*Primary Examiner*—Stanford M. Levin
*Attorney, Agent, or Firm*—Burgess, Ryan and Wayne

[57] ABSTRACT

A process for making crystalline polymers or copolymers of alpha-olefins containing 3 to 8 carbon atoms, such as polypropylene, by polymerization with a catalyst consisting of a combination of titanium chloride and an organic aluminum compound, in the presence of a stereospecificity additive.

This stereospecificity additive is a cyclic polyether of the crown ether type, which may contain sulphur atoms and/or nitro radicals; this additive may be used together with an activator.

The process produces polymers or copolymers with a high isotacticity index, while keeping catalyst activity sufficiently high.

35 Claims, No Drawings

PROCESS FOR MAKING ALPHA-OLEFIN POLYMERS OR COPOLYMERS WITH HIGH ISOTACTICITY INDEX

BACKGROUND OF THE INVENTION

This invention concerns a high-yield process for making alpha-olefin polymers or copolymers with a high isotacticity index by homopolymerization of an alpha-olefin containing 3 to 8 carbon atoms, sequence copolymerization of such alpha-olefins with one another and/or with ethylene, or copolymerization of mixtures of such alpha-olefins with one another and/or with ethylene, the mixture containing at least 85 and preferably 90 mole percent of one of these alpha-olefins, using a modified Ziegler-Natta catalyst consisting of a titanium chloride together with an organic aluminium compound, and in the presence of a stereospecificity additive.

Polymerization of an alpha-olefin containing 3 or more carbon atoms, such as propylene, using a Ziegler-Natta catalyst consisting of a titanium chloride, such as titanium trichloride, together with an organic aluminum compound, such as alkyl aluminum and alkyl aluminum chloride, is known to produce a polymerizate containing a polymer fraction with a crystalline structure under X-ray examination, alongside a polymer fraction with an amorphous structure under such examination. The polymer fraction with a crystalline structure, which consists of sterically regular macromolecular chains, is known as isotactic polymer, while the polymer fraction with an amorphous structure, which consists of sterically irregular macromolecular chains, is known as atactic polymer.

For industrial purposes, isotactic polymers or copolymers of alpha-olefins containing 3 or more carbon atoms are most useful, and attempts have been made to increase the isotactic polymer content of the polymerizate resulting from homopolymerization or copolymerization of these alpha-olefins, and reduce the atactic polymer content.

One suggested way of doing this is to improve the stereospecificity of the Ziegler-Natta catalyst consisting of a titanium chloride, such as titanium trichloride, and an organic aluminum compound, such as alkyl aluminum and alkyl aluminum chloride, by adding stereospecificity additives to it; this modified catalyst encourages production of a polymerizate made up almost entirely of isotactic polymer.

The many such additives recommended to improve the stereospecificity of catalysts consisting of a titanium chloride and an organic aluminum compound include phosphines, such as triphenylphosphine and tributylphosphine, amines, more specifically tertiary amines such as triethylamine, tributylamine and N,N-dimethylaniline, ethers, for example dialkylethers such as diethylether, dipropylether, and thioethers, for example dialkylthioethers and diarylthioethers such as diethylthioether or dipropylthioether.

But although these stereospecificity additives are effective in the sense that they improve the stereospecificity of the Ziegler-Natta catalyst and provide high-isotactic polyolefins, in a number of cases they cause a serious reduction in catalyst activity, in other words a drop in the quantity of polymer produced for a given quantity of catalyst. This is a major drawback, affecting the profitability of the polymerization process.

This invention offers a polymerization process of the type described in which particular stereospecificity additives are used to produce homo polymers or copolymers of alpha-olefins containing 3 to 8 carbon atoms with a high isotacticity index, while keeping the catalyst sufficiently active, and in which, in a specially recommended embodiment of the invention, these additives are combined with a compound acting as an activator, producing very high yields of high-isotactic polymer.

This new process to make homopolymers or copolymers of alpha-olefins containing 3 to 8 carbon atoms with a high isotacticity index, by homopolymerization of an alpha-olefin containing 3 to 8 carbon atoms, sequence copolymerization of such alpha-olefins with one another and/or with ethylene, or copolymerization of mixtures of such alpha-olefins with one another and/or with ethylene, such mixtures containing at least 85 mole percent of one such alpha-olefin, using a catalyst consisting of a titanium chloride together with an organic aluminum compound, in the presence of a stereospecificity additive, is characterized by the fact that this stereospecificity additive is a cyclic polyether, of the crown ether type, in which the molecule is made up of p groups with the formula $+X-C_nH_{2n}+$ and/or q groups with the formula $+X-R+$, arranged in any order to form a cycle in which any two adjacent groups in the cycle are connected by a bond between the element X in one of these adjacent groups and a carbon atom in the other group, where n is an integer from 1 to 6, R, which may be the same or different from one group to the other, represents divalent radicals selected from the group consisting of divalent radicals of aliphatic hydrocarbons containing 1 to 6 carbon atoms, divalent radicals of cycloaliphatic hydrocarbons containing 4 to 10 carbon atoms, divalent radicals of aromatic hydrocarbons containing 6 to 20 carbon atoms, and divalent radicals of furane, thiophene and pyridine, in which both free valencies are each borne by a carbon atom in the alpha position in relation to the heteroatom of these heterocycles, or by a carbon atom of an aliphatic hydrocarbon chain containing 1 to 6 carbon atoms fixed to the said carbon atom in the alpha position, p and q represent nought or integers such that $0 \leq p \leq 20$ and $0 \leq q < 4$ and $3 \leq (p+q) \leq 24$, X is either identical and represents oxygen atoms, or different and represents partly oxygen atoms and partly sulphur atoms and/or nitrogen-containing radicals with the formula $>N-R_1$, where $R_1$ is a hydrogen atom or alkyl radical containing 1 to 4 carbon atoms, and the number of oxygen atoms r, sulphur atoms s and nitrogen-containing radicals t in the cyclic polyether molecule are such that $1 \leq r \leq 28$, $0 \leq t \leq r$ and $0 \leq s \leq (r+t)$.

Alpha-olefins containing 3 to 8 carbon atoms suitable for such homopolymerization or copolymerization have the formula: $CH_2=CH-R_2$, where $R_2$ is an alkyl radical containing 1 to 6 carbon atoms. Such alpha-olefins comprise propylene, 1-butene, 1-pentene, 4-methyl-1-pentene, and 1-hexene. By means of this new process, high-isotactic homopolymers may be obtained by polymerizing a single alpha-olefin, or high-isotactic sequence copolymers by various sequence copolymerization process to copolymerize one such alpha-olefin with ethylene or at least two such alpha-olefins with or without ethylene, or, finally, high-isotactic random copolymers by copolymerizing a mixture of one such alpha-olefin with ethylene or a mixture of at least two such alpha-olefins with or without ethylene provided that the proportion of alpha-olefins containing 3 to 8 carbon atoms or of one such alpha-olefin containing 3 to 8 carbon atoms in the mixture is at least 85 mole percent. High-isotactic polymers or copolymers obtained by this new process comprise polypropylene, 1-polybutene, 1-polypentene, poly(4-methyl-1-pentene), random copolymers of propylene and ethylene, propylene and 1-butene, propylene and 4-methyl-1-pentene, or propylene and 1-hexene, containing more than 85 mole percent propylene, and sequence copolymers of propylene and ethylene, propylene and 1-butene, or 1-butene and ethylene.

The organic aluminum compound forming one ingredient of the catalyst used for this process is preferably a compound with the general formula:

AlY$_a$X(3-a), where:

Y is an alkyl radical containing 1 to 8 carbon atoms, a cycloalkyl radical containing 4 to 8 carbon atoms, or an aryl radical containing 6 to 8 carbon atoms, X is a halogen atom, such as a chlorine atom, and a is a number equal to 1, 1.5, 2 or 3.

Recommended compounds of this type are those with the formulae:

AlY$_2$Cl and AlY$_3$, where:

Y has the meaning already defined, more specifically a phenyl or cyclohexyl radical or an alkyl radical containing 2 to 6 carbon atoms, such as ethyl, propyl, isopropyl, butyl, isobutyl and hexyl.

Such compounds comprise diethyl aluminum chloride, dibutyl aluminum chloride, triethyl aluminum, tripropyl aluminum, tributyl aluminum, and tri-isobutyl aluminum.

The titanium chloride combined with the organic aluminium compound is preferably a titanium trichloride, which may be any titanium trichloride known in the existing art as a component of Ziegler-Natta catalysts. This titanium chloride may be obtained by the following methods in particular:

reduction of titanium tetrachloride by a metal such as aluminum or titanium, the reduced product possibly being crushed;

reduction of titanium tetrachloride by hydrogen;

reduction of titanium tetrachloride by an organo-metallic compound such as alkyl aluminum;

crushing a mixture of titanium trichloride and a halide of a metal in column III of the Periodic Table of Elements, such as an aluminum halide.

Titanium trichlorides modified by being treated in the presence of compounds such as tertiary amines, camphor, dialkyl ethers, or phosphorus compounds such as phosphorus oxychloride, are also suitable for use in this new process.

Stereospecificity additives as defined above comprise in particular those containing groups with the formula:

—[X-C$_n$H$_{2n}$]— where: n is an integer from 1 to 4, R, which may be the same or different from one group to the other, represents divalent radicals selected from the group consisting of divalent radicals of aliphatic hydrocarbons containing 1 to 4 carbon atoms, divalent radicals of cycloaliphatic hydrocarbons containing 6 to 8 carbon atoms, divalent radicals of aromatic hydrocarbons containing 6 to 20 carbon atoms, and divalent radicals of furane, thiophene and pyridine, in which both free valencies are each borne by a carbon atom in the alpha position in relation to the heteroatom of these heterocycles, or by a carbon atom of an aliphatic hydrocarbon chain containing 1 to 4 carbon atoms fixed to the said carbon atom in the alpha position, p and q represent nought or integers such that $0 \leq p \leq 18$ and $0 \leq q \leq 4$ and $3 \leq (p+q) \leq 20$, X is either identical and represents oxygen atoms, or different and represents partly oxygen atoms and partly sulphur atoms and/or nitrogen-containing radicals with the formula >N-R$_1$, and the number of oxygen atoms r, sulphur atoms s and nitrogen-containing radicals t in the cyclic polyether molecule are such that $1 \leq r \leq 24$, $0 \leq t \leq r$ and $0 \leq s \leq (r+t)$.

Recommended stereospecificity additives as defined above are those in which the cyclic molecule contains p groups with the formula —[X-CH$_2$-CH$_2$]— and/or q groups with the formula —[X-R]—, where R represents identical or different divalent radicals selected from the group consisting of divalent radicals of aliphatic hydrocarbon containing 1 to 4 carbon atoms, divalent radicals of cycloaliphatic hydrocarbons containing 6 to 8 carbon atoms, aromatic divalent radicals with the formulae:

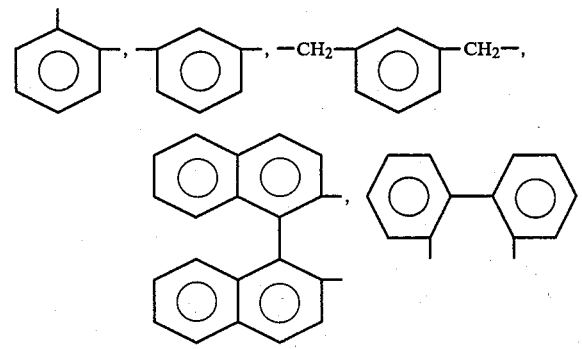

and heterocyclic divalent radicals with the formulae

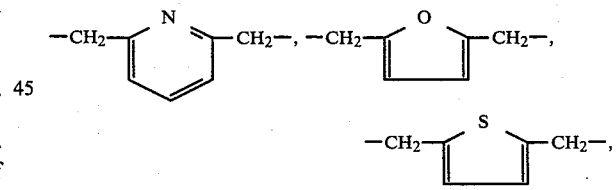

where:

p and q represents nought or integers such that $0 \leq p \leq 18$ and $0 \leq q \leq 4$ and $3 \leq (p+q) \leq 20$, and X is either identical and represents oxygen atoms, or different and represents partly oxygen atoms and partly sulphur atoms and/or nitrogen-containing radicals with the formula <N-R$_1$, and the number of oxygen atoms r, sulphur atoms s and nitrogen-containing radicals t in the polyether molecule are such that $1 \leq r \leq 20$, $0 \leq t \leq r$ and $0 \leq s \leq (r+t)$.

Specially recommended stereospecificity additives are those with the formula:

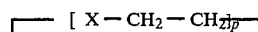

where:

p is an integer from 3 to 12,

X is either identical and represents oxygen atoms, or different and represents partly oxygen atoms and partly sulphur atoms and/or nitrogen-containing radicals with the formula $<N-R_1$, and the number of oxygen atoms r, sulphur atoms s and nitrogen-containing radicals t in the polyether molecule are such that $1 \leq r \leq p$, $0 \leq t \leq r$ and $0 \leq s \leq (r+t)$.

Cyclic polyethers of the crown ether type suitable for use as stereospeficity additives in this process include compounds such as:
2,3-11,12-dibenzo 1,4,7,10,13,16-hexaoxacyclo-octadecane (18-dibenzo 6-crown crown ether),
2,3-benzo 1,4,7,10,13,16-hexaoxacyclo-octadecane
2,3-benzo 1,4,7-trioxycyclononane,
2,3-benzo 1,4,7,10-tetraoxacyclododecane,
2,3-9,10-dibenzo 1,4,8,11-tetraoxacyclotetradecane
2,3-8,9-dibenzo 1,4,7,10-tetraoxacyclododecane,
2,3-12,13-dibenzo 1,4,11,14-tetraoxacyclo-eicosane,
2,3-benzo 1,4,7,10,11-pentaoxacyclo-pentadecane,
2,3-8,9-14,15-tribenzo 1,4,7,10,13,16-hexaoxacyclo-octadecane,
2,3-11,12-dibenzo 1,4,7,10,13-pentaoxapentadecane,
2,3-11,12-dibenzo 1,4,7,10,13-pentaoxa-16-azacyclo-octadecane,
2,3-benzo 1,4,7,10,13-pentaoxa-4-azacyclo-octadecane,
2,18-furano 4,7,10,13,16-pentaoxacyclo-octadecane,
2,18-12,14-difurano 4,7,10,16-tetraoxacyclo-octadecane,
2,18-9,11-difurano 4,7,13,16-tetraoxacyclo-octadecane,
2,18-6,8-12,14-trifurano 4,10,16-trioxacyclo-octadecane,
2,18-pyridino 4,7,10,13,16-pentaoxacyclo-octadecane,
2,18-9,11-dipyridino 4,7,13,16-tetraoxacyclo-octadecane,
2,18-6,8-12,14-tripyridino 4,10,16-trioxacyclo-octadecane,
1,3-benzo 5,8,11,14,17-pentaoxacyclo-octadecane,
1,2-13,14-dibenzo 3,6,9,12-N-tetraza 15,18,21,24-tetraoxacyclotetra-eicosane,
2,18-pyridino 5,6-14,15-dibenzo 4,7,10,13, 16-pentaoxacyclo-octadecane,
2,18-pyridino 7,10,13-trioxa 4,16-dithiacyclo-octadecane,
1,2-3,4-dibenzo 5,8,11,14,17,20-hexaoxacyclo-eicosane,
and more specifically compounds such as:
1,4,7,10-tetraoxacyclododecane (4-crown-12 crown ether),
1,4,7,10,13,16-hexaoxacyclo-octadecane (6-crown-18 crown ether),
1,4,7,10,13-pentaoxacyclo-octadecane,
1,4-dioxa 7-thiacyclononane,
1,4,7-trioxa 10-thiacyclododecane,
1,4-dioxa 7,10-dithiacyclododecane,
1,4,7,10-tetraoxa 13-thiacyclopentadecane,
1,4,7-trioxa 10,13-dithiacyclopentadecane,
1,7-dioxa 4,10-dithiacyclododecane,
1,4,10-trioxa 7,13-dithiacyclopentadecane,
1,4,7,10,13-pentaoxa 16-thiacyclo-octadecane,
1,4,7,10-tetraoxa 13,16-dithiacyclo-octadecane,
1,4,7,13-tetraoxa-10,16-dithiacyclo-octadecane,
1,4,7-trioxa 10,13,16-trithiacyclo-octadecane,
1-oxa 4,10-dithia 7-azacyclododecane
1,7-dioxa 4,10-diazacyclododecane,
1,7,10-trioxa 4,13-diazacyclopentadecane,
1,7,10,16-tetraoxa 4,13-diazacyclo-octadecane.

The catalyst may be used without any substrate, or may be deposited on or fixed to an inorganic or organic substrate, for example fixed to an inorganic substrate such as a metal oxide, carbonate or hydroxychloride like magnesium oxide, magnesium carbonate or magnesium hydroxychloride.

The quantity of stereospecificity additive required is such that the ratio of the number of titanium atoms to the number of additive molecules in the polymerization mixture is between 1 and 100, and preferably between 1 and 70.

The proportions of titanium trichloride and organic aluminum compound may vary widely depending on whether or not the catalyst is on a substrate. For example, when a catalyst with substrate is used, the ratio of the number of aluminum atoms to the number of titanium atoms in the polymerization mixture is between 1 and 500, and preferably between 50 and 200. When a catalyst without substrate is used, this ratio is between 1 and 10, and preferably between 2 and 5.

The catalyst may be preformed before being added to the polymerization mixture, but in some cases it may be formed in situ in the polymerization mixture. Whether preformed before addition to the mixture or formed in situ, the whole preformed catalyst or all its components may be added to the polymerization mixture at the beginning of polymerization, or in fractions or continuously throughout polymerization.

There are no special requirements concerning incorporation of the stereospecificity additive in the polymerization mixture, and various methods may be used. For example, when a catalyst consisting of a titanium chloride, such as a titanium trichloride, and organic aluminum compound is preformed before injection into the polymerization mixture, the stereospecificity additive may be added to the titanium chloride and organic aluminum compound, by mixing all three components directly or by premixing the additive with one of the other two components and subsequently adding the remaining component, the resulting mixture being injected into the polymerization mixture, or else the stereospecificity additive may be injected into the polymerization mixture first, followed by the titanium chloride and organic aluminum compound mixture. When the titanium chloride and organic aluminum compound are injected separately into the polymerization mixture to form the catalyst in situ, the stereospecificity additive may be either added separately to the polymerization mixture, or mixed with the titanium chloride or organic aluminum compound before they are injected into the polymerization mixture.

When the additive is premixed with the organic aluminum compound, this is done by placing additive and compound in solution in an inert solvent, such as a hydrocarbon like heptane. The resulting solution can then easily be injected into the polymerization mixture.

When the additive is to be premixed or made into a composition with the titanium chloride, such as a titanium trichloride, before being added to the polymerization mixture, this is preferably done by techniques such as those summarized below:

dry crushing together of the additive with titanium trichloride in violet form (obtained by reducing titanium tetrachloride with a metal, such as aluminum), in a ball-mill;

mixing the additive while being agitated with a titanium chloride in violet form in an inert diluent, such as a saturated hydrocarbon like heptane, hexane or mineral oil;

mixing the additive while being agitated with a titanium chloride in beta form (obtained by reducing titanium tetrachloride with an alkyl aluminum) in an inert diluent, such as a saturated hydrocarbon, then, after the diluent has evaporated, collecting the beta titanium trichloride containing the additive, using titanium tetrachloride, at 70° to 130° C., to obtain a violet titanium trichloride containing the additive;

mixing the additive while being agitated with a titanium trichloride in violet form in an inert diluent, such as a saturated hydrocarbon like hexane or heptane, at a temperature of approximately 40° C., then collecting it using titanium tetrachloride in an inert diluent at approximately 65° C.;

forming a composition by mixing the additive and titanium tetrachloride in given proportions, then crushing this composition dry together with anhydrous magnesium chloride (as substrate), and finally treating the resulting crushed powder with an alkyl aluminum which may or may not contain a stereospecificity additive, to produce a supported titanium trichloride containing the additive.

Compositions containing a titanium chloride, such as titanium trichloride or titanium tetrachloride, and an additive suitable for use in this new process, such as those obtained by the methods described above, may be prepared just before use, or prepared in advance and stored in the form of a suspension in an inert diluent, such as a saturated hydrocarbon like hexane, heptane or mineral oil. These compositions are injected into the polymerization mixture in the form of a suspension in an inert diluent, such as a saturated hydrocarbon like hexane, heptane or mineral oil.

In one recommended embodiment of the invention, providing higher yields than in the presence of the additive alone, and without reducing the isotacticity index of the polymerizate, the polymerization mixture may contain one or more activators selected from the group comprising acyclic or cyclic polyenes and dihydrocarbylacetylenes in which the hydrocarbyl radicals are selected from aryl radicals containing 6 to 16 and preferably 6 to 8 carbon atoms, and alkyl radicals containing 1 to 16 and preferably 1 to 8 carbon atoms. Compounds functioning as activator, in other words increasing the quantity of the polymer produced for a given quantity of titanium chloride and organic aluminum compound catalyst, comprise more specificially cyclooctadiene, 1,3,5-cycloheptatriene, cyclododecatriene, cyclooctatetraene, 3-methyl 1,4,6-heptatriene, diphenylacetylene, ditolylacetylene, methylphenylacetylene, dimethylacetylene, diethylacetylene, dipropylacetylene, dibutylacetylene, dihexylacetylene and dioctylacetylene.

The proportion of activator in the polymerization mixture can vary quite considerably, but is preferably such that the ratio of the number of titanium atoms to the number of molecules of activator in the polymerization mixture is between 1 and 100, and preferably between 1 and 70.

The activator may be added to the polymerization mixture in the same way as the stereospecificity additive, either separately from or mixed with the additive.

Consequently, additive and activator may be injected into the polymerization mixture separately from each other and separately from the catalyst components. Alternatively, the additive may be injected after being mixed with one of the catalyst components, while the activator is injected with the other component or alone, or the activator is injected after being mixed with one catalyst component, while the additive is injected alone. Additive and activator may also be injected after being mixed with either catalyst component. For example, additive and activator may be injected together after being mixed with the titanium chloride. In this case the composition or premixture of titanium chloride, additive and activator is preferably prepared by methods similar to those summarized above for premixing of titanium chloride and additive.

In such compositions containing titanium chloride, additive and activator, which may be prepared just before use or made in advance, stored and used in suspension in an inert diluent such as a saturated hydrocarbon like heptane, hexane or mineral oil, as well as in the corresponding preformed compositions already mentioned and not containing any activator, the proportions of titanium, additive and possibly activator are preferably such that the respective ratios of the number of titanium atoms to the number of molecules of additive and to the number of molecules of activator are between 1 and 100, and preferably between 1 and 70.

In addition, in compositions containing titanium chloride, additive and activator, the relative proportions of additive and activator are preferably such that the ratio of the number of additive molecules to the number of activator molecules is between 0.2 and 5, and preferably between 0.5 and 2.

The relative proportions of additive and activator in the polymerization mixture may also vary quite considerably, but are preferably such that the ratio of the number of additive molecules to the number of activator molecules is between 0.2 and 5, and preferably between 0.5 and 2.

Polymerization, in other words the process by which the alpha-olefin or alpha-olefins are brought into contact with the catalyst in the presence of the additive and possibly activator to produce polymer or copolymer, may be performed under normal conditions as known in the existing art.

For example, the polymerization temperature may be between 0° and 150° C., and preferably between 40° and 120° C., with absolute pressure ranging from slightly above atmospheric pressure to approximately 100 bars.

Polymerization may be performed either in an inert liquid phase such as an inert hydrocarbon like hexane, heptane or benzene, or using the alpha-olefin or mixture of alpha-olefins to be polymerized, kept in a liquid state, as polymerization mixture, or using a gas phase. When polymerization is done in an inert liquid phase, polymerization pressure is usually less than approximately 15 to 20 bars; on the other hand, when the alpha-olefin or mixture of alpha-olefins to be polymerized is used as polymerization mixture, much higher pressures are applied, so as to keep the alpha-olefin or mixture of alpha-olefins in a liquid phase. For example, when a liquid propylene phase is used, polymerization pressure is usually about 30 bars.

The molecular weights of polymers can be adjusted by using standard transfer agents, such as hydrogen.

When polymerization is completed, the polymerizate is deactivated and separated from the polymerization mixture, and if necessary undergoes additional purification treatment, using any existing techniques. The method described in French patent application number 76 21292 (Publication No. 2 358 423) of July 12, 1976 in the applicant's name may be used for separation and purification of the polymer produced by a propylene polymerization process.

Alpha-olefin polymers and copolymers obtained by means of this new process are characterized by high isotacticity index and high yields.

The isotacticity index of a polymer means the percentage ratio of the weight of solid residue left after extraction of the polymer in n-heptane in a Soxhlet apparatus for two hours to the weight of polymer before undergoing this extraction process. The isotacticity index corresponds to the percentage weight of the isotactic fraction of the polymer.

The invention is illustrated by the following examples, without being in any way confined to them.

EXAMPLE 1

This example was carried out for reference. Propylene was polymerized in heptane, using a catalyst consisting of titanium chloride, specifically a commercial chloride with the formula $TiCl_3\text{-}\frac{1}{3}AlCl_3$, and an organic aluminum compound, specifically diethyl aluminum chloride (DEAC), without any stereospecificity additive, and using the following operating procedure.

Polymerization was performed in a 1-liter glass reactor equipped with a rotary agitator and submerged in a thermostatic bath, in order to keep the reactor contents at the right temperature for polymerization. The reactor had first been washed with a solution of the DEAC in heptane, then rinsed out with heptane.

An inert atmosphere was created inside the reactor, and the reaction mixture was prepared, consisting of dried, degassed heptane, propylene, hydrogen, and the catalyst components, DEAC and $TiCl_3\text{-}\frac{1}{3}AlCl_3$, which were injected into the reactor with a syringe, in the form of a DEAC solution and a titanium chloride suspension in sodium-dried and degassed heptane.

The quantities of the various products were such that the reaction mixture had the following properties:

| | |
|---|---|
| Heptane content | 500 ml |
| Propylene pressure | 2.2 kg/cm$^2$ |
| Hydrogen pressure | 0.025 kg/cm$^2$ |
| $TiCl_3\text{-}\frac{1}{3}AlCl_3$ | 0.3 g |
| DEAC/titanium compound molar ratio | 2.8 |

This reaction mixture was kept at 70° C., while being agitated at 625 rpm, for 3½ hours.

When the reaction was completed, any propylene that had not reacted was degassed slowly to flares, and an anti-oxidant solution was injected into the degassed mixture. 5 minutes later 10 cc ethanol was injected and agitation continued for a further 10 minutes.

All polypropylene produced during the polymerization reaction was then collected, by pouring the suspension of polypropylene in heptane inside the reaction container into a crystallizer. The heptane was evaporated under a hood at atmospheric temperature, then in a vacuum at 60° C. The solid evaporation residue containing the isotactic and atactic fractions of polypropylene was collected and underwent homogenization in a mixer, to produce propylene that would be as homogeneous as possible.

Two types of measurements were made on this homogenized polypropylene: titanium content to show catalyst activity, and isotacticity index.

The titanium content of the polypropylene was measured, after mineralization and calcining, by a colorimetric method. The quantity of $AlCl_3$-free $TiCl_3$ could be worked out from the titanium content, as well as catalyst activity, namely the number of grams of polypropylene produced per gram of $TiCl_3$.

The isotacticity index was measured by means of hollow cartridges of a porous material inert in relation to n-heptane. An empty catridge was first placed in contact with 99% pure n-heptane in a Soxhlet extraction apparatus for 2 hours. This cartridge was then dried in a vacuum at 50° C., and its weight $W_1$ measured. It was filled with a certain quantity of polypropylene (approximately 10 g) and the combined weight $W_2$ was measured. The full cartridge then underwent extraction with 99% n-heptane in the Soxhlet apparatus for 2 hours, after which it was dried in a vacuum at 50° C., and its weight $W_3$ measured.

The isotacticity index of the polypropylene, namely the ratio, expressed in pecentage weight, of solid residue remaining after extraction of polypropylene with n-heptane in a Soxhlet apparatus for 2 hours to the weight of polypropylene before extraction, corresponding to the percentage weight of the isotactic polymer fraction in the polypropylene, is shown by the formula:

$$W_3 - W_1 / W_2 - W_1 \times 100$$

The resulting polypropylene had an isotacticity index of 93 to 93.2, and a melt flow index ($MI_2^{230}$) of 2 to 5, while catalyst activity was 290 to 300.

Melt flow indices ($MI_2^{230}$) in this and the following examples were measured in accordance with ASTM standard D 1238, at a temperature of 230° C. and under a 2.16 kg load.

EXAMPLE 2

Propylene was polymerized using an operating procedure similar to the one described in Example 1. Tests 201 to 205 were done using stereospecificity additives as defined above, and test 206 using dioxane, for purposes of comparison.

In each test, catalyst components, namely DEAC and $TiCl_3\text{-}\frac{1}{3}AlCl_3$, were injected separately into the reactor, and the stereospecificity additive (or product used for comparison) was injected after being mixed with the titanium compound. This was done by agitating the additive or compound for comparison with the titanium compound in a suitable volume of heptane for long enough to obtain a homogeneous suspension that could be injected into the reactor by syringe.

Table I below shows the specific conditions for each test and their results, together with the results of reference test 101 in Example 1.

The results given in Table I show that use of stereospecificity additives as defined above considerably raises the isotacticity index of the polypropylene produced, while keeping catalyst activity sufficiently high (compare tests 201 to 205 with reference test 101). However, use of dioxane as additive reduces the isotacticity index of the polypropylene by about 6 points (compare test 206 with reference test 101).

TABLE I

| | Stereospecificity additive | | Polypropylene | | | |
|---|---|---|---|---|---|---|
| Test No. | Nature | Ti compound/ additive molar ratio | Catalyst activity | Isotacticity index | Melt flow index ($MI_2^{230}$) | Apparent density (g/l) |
| 201 | 12 C 4$^{(a)}$ | 15 | 272 | 95.9 | 1.8 | |
| 202 | 12 C 4 | 30 | 284 | 95.4 | 0.5 | 0.440 |

TABLE I-continued

| Test No. | Stereospecificity additive Nature | Stereospecificity additive Ti compound/ additive molar ratio | Polypropylene Catalyst activity | Polypropylene Isotact- icity index | Polypropylene Melt flow index (MI$_2^{230}$) | Polypropylene Apparent density (g/l) |
|---|---|---|---|---|---|---|
| 203 | 18 C 6[b] | 15 | 280 | 95.1 | 1.2 | |
| 204 | 18 C 6 | 30 | 295 | 94.5 | 1.4 | 0.430 |
| 205 | DDC[c] | 30 | 275 | 95.7 | | |
| 206 | Dioxane | 30 | 290 | 89 | | |
| 101 | None | | 290–300 | 93–93.2 | 2–5 | |

[a]1,4,7,10-tetraoxacyclododecane (4-crown 12 crown ether)
[b]1,4,7,10,13,16-hexaoxacyclo-octadecane (6-crown 18-crown ether)
[c]1,7-dioxa 4,10-dithiacyclododecane.

EXAMPLE 3

Propylene was polymerized using an operating procedure similar to the one described in Example 1. Polymerization was performed in the presence of a stereospecificity additive and an activator as defined above, used together.

The catalyst components, DEAC and TiCl$_3$-$\frac{1}{3}$AlCl$_3$, were injected separately into the reactor in the form of a DEAC solution or titanium compound suspension in heptane, while the additive and activator were injected after being mixed with the titanium compound, in the form of a suspension in heptane.

The test was repeated under similar conditions, except that the activator was used without stereospecificity additive or the additive without activator. In this case the stereospecificity additive or activator was injected into the reactor alone after being mixed with the titanium compound, in the form of a suspension in heptane.

Table II below shows the specific conditions for each test and their results, together with the result of reference test 101 in Example 1.

Combined use of a stereospecificity additive and activator as defined above have a synergistic effect, producing much higher catalyst activity than could be expected from the results of use of additive alone and activator alone, and without reducing the isotacticity index of the polypropylene obtained by using additive alone (compare test 301 with tests 302 and 303 and with reference test 101).

TABLE II

| Test No. | Stereospecificity additive Nature | Stereospecificity additive Ti compound/ activator molar ratio | Activator Nature | Activator Ti compound/ additive molar ratio | Polypropylene Isotact- icity index | Polypropylene Catalyst activity |
|---|---|---|---|---|---|---|
| 301 | 18 C 6 | 30 | DPA* | 30 | 94.4 | 320 |
| 302 | 18 C 6 | 30 | None | | 94.5 | 295 |
| 303 | None | | DPA | 30 | 93.2 | 310 |
| 101 | None | | None | | 93–93.2 | 290–300 |

*diphenylacetylene

This combination of stereospecificity additive and activator as defined above, by producing a much higher lever of catalyst activity, further improves the excellent effect on the isotacticity index of polypropylene of use of stereospecificity additive alone.

Naturally, this invention is in no way confined to the Examples and embodiments described above; many variant forms are possible for someone skilled in the art, depending on applications, and without any departure from the spirit of the invention.

What is claimed is:

1. A process for making polymers or coplymers of alpha-olefins containing 3 to 8 carbon atoms with a high isotacticity index, comprising polymerizing an alpha-olefin containing 3 to 8 carbon atoms, using a catalyst consisting of a titanium chloride together with an organic aluminum compound, in the presence of a stereospecificity additive, said stereospecificity additive being a cyclic polyether of the crown ether type, in which the molecule is made up of from 0 to 20 p groups of the formula $+X-C_nH_{2n}+$ and from 0 to 4 q groups of the formula $+X-R+$, with the number of p groups and q groups together being from 3 to 24, arranged in any order to form a cycle in which any two adjacent groups in the cycle are connected by a bond between the element X in one of these adjacent groups and a carbon atom in the other group, where n is an integer from 1 to 6, R, which is the same or different from one group to the other, represents divalent radicals selected from the group consisting of divalent radicals of aliphatic hydrocarbons containing 1 to 6 carbon atoms, divalent radicals of cycloaliphatic hydrocarbons containing 4 to 10 carbon atoms, divalent radicals of aromatic hydrocarbons containing 6 to 20 carbon atoms, and the divalent heterocyclic radicals of furane, thiophene and pyridine, in which both free valences are each borne by a carbon atom in the alpha position in relation to the heteroatom of these heterocycles, or by a carbon atom of an aliphatic hydrocarbon chain containing 1 to 6 carbon atoms fixed to the said carbon atom in the alpha position, and X is either identical in all the groups and represents oxygen atoms, or is different from one group to the other and represents partly oxygen atoms and partly sulphur atoms, nitrogen-containing radicals of the formula: $>N-R_1$, or both, where $R_1$ is a hydrogen atom or alkyl radical containing 1 to 4 carbon atoms, and the number of oxygen atoms r, sulphur atoms s and nitrogen-containing radicals t in the cyclic polyether molecule are such that $0 \leq t \leq r$, $0 \leq s \leq (r+t)$ and $1 \leq r \leq 28$.

2. A process as defined in claim 1, in which the stereospecificity additive comprises from 0 to 18 p groups and the number of p groups and q groups together being from 3 to 20, n is an integer from 1 to 4, and R, which is the same or different from one group to the other, represents divalent radicals selected from the group consisting of divalent radicals of aliphatic hydrocarbons containing 1 to 4 carbon atoms, divalent radicals of cyclo-aliphatic hydrocarbons containing 6 to 8 carbon atoms, divalent radicals of aromatic hydrocarbons containing 6 to 20 carbon atoms, and the divalent heterocyclic radicals of furane, thiophene and pyridine, in which both free valences are each borne by a carbon atom in the alpha position in relation to the heteroatom, or by a carbon atom of an aliphatic hydrocarbon chain containing 1 to 4 carbon atoms fixed to the said carbon atom in the alpha position, and $1 \leq r \leq 24$.

3. A process as defined in claim 2, in which the p groups have the formula $+X-CH_2-CH_2+$, the R radicals are selected from the group consisting of divalent radicals of aliphatic hydrocarbons containing 1 to 4 carbon atoms, divalent radicals of cyclo-aliphatic hydrocarbons containing 6 to 8 carbon atoms, aromatic divalent radicals of the formulae:

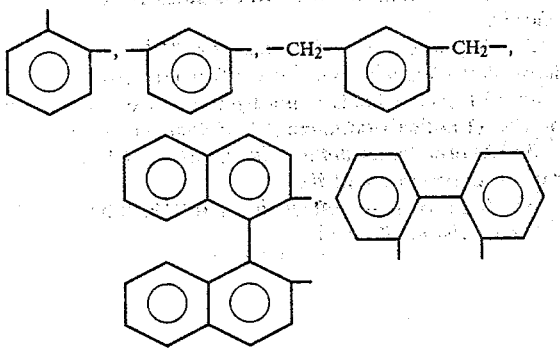

and heterocyclic divalent radicals of the formulae

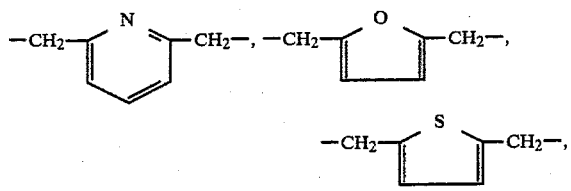

and the number of oxygen atoms r is such that $1 \leq r \leq 20$.

4. A process as defined in claim 3, in which the stereospecificity additive has the formula:

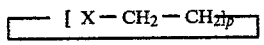

where:
p is an integer from 3 to 12, and $1 \leq r \leq p$.

5. A process as defined in any one of claims 1 to 4, in which the organic alunimum compound in the catalyst has the formula:

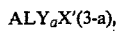

where:
Y is an alkyl radical containing 1 to 8 carbon atoms, a cyclo-alkyl radical containing 4 to 8 carbon atoms, or an aryl radical containing 6 to 8 carbon atoms,
X' is a halogen atom, and
a is a number equal to 1, 1.5, 2 or 3.

6. A process as defined in claim 5, in which the organic aluminum compound in the catalyst has the formula:

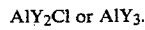

7. A process as defined in any one of claims 1 to 4, in which the titanium chloride is a titanium trichloride.

8. A process as defined in claim 7, in which the titanium trichloride is obtained by reduction of titanium tetrachloride by a metal.

9. A process as defined in claim 7, in which the titanium trichloride is obtained by reduction of titanium tetrachloride by hydrogen or by an organo-metallic compound.

10. A process as defined in claim 7, in which the titanium trichloride is obtained by crushing a mixture of titanium trichloride and a halide of a metal in column 3 of the Periodic Table of Elements.

11. A process as defined in claim 7, in which the titanium trichloride is modified by being treated in the presence of a tertiary amine, camphor, a dialkyl ether, or a phosphorus compound.

12. A process as defined in any one of claims 1 to 4, in which the catalyst is deposited on or fixed to an inorganic or organic substrate.

13. A process as defined in any one of claims 1 to 4, in which the ratio of the number of titanium atoms to the number of additive molecules in the polymerization mixture is between 1 to 100.

14. A process as defined in any one of claims 1 to 4, in which the catalyst consisting of titanium chloride and organic aluminum compound is preformed before being injected into the polymerization mixture, and the stereospecificity additive is injected into this mixture either mixed with the preformed catalyst or separately.

15. A process as defined in any one of claims 1 to 4, in which the titanium chloride and organic aluminum compound together forming the catalyst are injected separately into the polymerization mixture, and the stereospecificity additive is injected into this mixture either separately from the catalyst components or mixed with either the titanium chloride or the organic aluminum compound before they are injected.

16. A process as defined in any one of claims 1 to 4, in which, in addition to the stereospecificity additive, the polymerization mixture contains one or more activators, selected from the group consisting of acyclic or cyclic polyenes and dihydrocarbylacetylenes in which the hydrocarbyl radicals are selected from the group consisting of aryl radicals containing 6 to 16 carbon atoms and alkyl radicals containing 1 to 16 carbon atoms.

17. A process as defined in claim 16, in which the ratio of the number of titanium atoms to the number of molecules of activator in the polymerization mixture is between 1 to 100.

18. A process as defined in claim 16, in which the relative proportions of stereospecificity additive and activator are such that the ratio of the number of additive molecules to the number of activator molecules is between 0.2 and 5.

19. A process as defined in claim 16, in which the activator is added to the polymerization mixture either separately from or mixed with the stereospecificity additive.

20. A process as defined in claim 1, wherein said alpha-olefins are homopolymerized.

21. A process as defined in claim 1, wherein said alpha-olefins are sequence copolymerized with one another, with ethylene, or with one another and ethylene.

22. A process as defined in claim 1, wherein at least 85 mole percent of one of said alpha-olefins is copolymerized with another of said alpha-olefins, with ethylene, or with another of said alpha-olefins and ethylene.

23. A process as defined in claim 6, wherein Y is an alkyl radical containing 2 to 6 carbon atoms, cyclohexyl, or phenyl.

24. A process as defined in claim 5, in which the titanium chloride is a titanium trichloride.

25. A process as defined in claim 6, in which the titanium chloride is a titanium trichloride.

26. A process as defined in claim 23, in which the titanium chloride is a titanium trichloride.

27. A process as defined in claim 8, wherein said metal is aluminum or titanium.

28. A process as defined in claim 9, wherein said organo-metallic compound is alkyl aluminum.

29. A process as defined in claim 5, wherein X' is chlorine.

30. A process as defined in claim 10, wherein said metal halide is an aluminum halide.

31. A process as defined in claim 11, wherein said phosphorous compound is phosphorous oxychloride.

32. A process as defined in claim 13, wherein the ratio of titanium atoms to additive molecules is between 1 and 70.

33. A process as defined in claim 16, wherein the hydrocarbyl radicals are selected from the group consisting of aryl radicals containing 6 to 8 carbon atoms and alkyl radicals containing 1 to 8 carbon atoms.

34. A process as defined in claim 17, wherein said ratio is between 1 and 70.

35. A process as defined in claim 18, wherein said ratio is between 0.5 and 2.

* * * * *

UNITED STATES PATENT OFFICE
CERTIFICATE OF CORRECTION

Patent No. 4,228,253　　　　　　　Dated October 14, 1980

Inventor(s) Gilbert Marie

It is certified that error appears in the above-identified patent and that said Letters Patent are hereby corrected as shown below:

Column 4, line 57 and column 5, line 4: "$<N-R_1$" should be -- $>N-R_1$ --.

Column 7, line 44: "specificially" should be --specifically--.

Column 8, lines 62-63: "purfication" should be --purification--.

Column 9, line 60: "propylene" should be --polypropylene--.

Column 10, line 16: "pecentage" should be --percentage--.

Column 11, line 63: "lever" should be --level--.

Column 12, line 4: " coplymers" should be --copolymers--.

Column 13, line 38 and column 14, line 14: "alunimum" should be --aluminum--.

Signed and Sealed this

Ninth Day of June 1981

[SEAL]

Attest:

RENE D. TEGTMEYER

Attesting Officer　　Acting Commissioner of Patents and Trademarks